(12) United States Patent
Mughal et al.

(10) Patent No.: US 7,471,875 B2
(45) Date of Patent: Dec. 30, 2008

(54) METHOD AND SYSTEM FOR PROVIDING INSTANT REVERSE PLAY

(75) Inventors: Mushtaq Ahmad Mughal, Islamabad (PK); Abid Khan, Islamabad (PK); Mumtaz Ahmad, Islamabad (PK); Haroon Ur Rashid, Islamabad (PK)

(73) Assignee: Streaming Networks (Pvt.) Ltd., Islamabad (PK)

( * ) Notice: Subject to any disclaimer, the term of this patent is extended or adjusted under 35 U.S.C. 154(b) by 753 days.

(21) Appl. No.: 11/182,158

(22) Filed: Jul. 15, 2005

(65) Prior Publication Data

US 2007/0014531 A1 Jan. 18, 2007

(51) Int. Cl.
*H04N 5/91* (2006.01)
(52) U.S. Cl. .......................... 386/68; 386/111; 386/124; 386/33; 386/35; 386/40; 386/109; 386/112
(58) Field of Classification Search .................... 386/68, 386/111, 124, 33, 35, 40, 109, 112
See application file for complete search history.

(56) References Cited

U.S. PATENT DOCUMENTS 5,909,257 A * 6/1999 Ohishi et al. ................. 348/726

(Continued)

FOREIGN PATENT DOCUMENTS

EP     1 388 862     2/2004

(Continued)

*Primary Examiner*—Thai Tran
*Assistant Examiner*—Helen Shibru

(74) *Attorney, Agent, or Firm*—Sonnenschein Nath & Rosenthal LLP

(57) ABSTRACT

A method for displaying video data instantly in reverse order is disclosed. According to the method, a compressed audio and video (A/V) stream is received from a source. The compressed A/V stream is demultiplexed into an audio stream and a video stream. The video stream has a number of compressed video frames which include a number of key frames. Each key frame is followed by one or more associated frames. Each of the compressed video frames is tagged with a tag. The tag associated with each key frame and file position of each key frame is stored in a table. The compressed video frames are decoded to generate a number of decoded video frames while maintaining their corresponding tags. During normal play, the decoded video frames are stored in a forward queue, and the decoded video frames in the forward queue are then outputted in a FIFO (first-in-first-out) order to a reverse queue and a display device for display. The reverse queue operates in a FIFO manner by discarding the oldest decoded video frame stored in the reverse queue when the reverse queue is full. During reverse play, the tag of the oldest decoded video frame in the reverse queue is recorded when a reverse play command is received, and the decoded video frames in the reverse queue are outputted in a LIFO (last-in-first-out) order to the forward queue and the display device for display. At the start of the reverse play, the forward queue operates in a LIFO manner until the most recently decoded video frames stored in the forward queue are discarded. Thereafter, the forward queue and the reverse queue operate in a FIFO manner. The recorded tag is used to retrieve one or more compressed video frames from the source. The retrieved one or more compressed video frames are tagged and decoded to generate one or more newly decoded video frames. The one or more newly decoded video frames are forwarded to the reverse queue.

20 Claims, 4 Drawing Sheets

| 1.0 | 1.1 | 1.2 | 1.3 | 1.4 | 1.5 | 1.6 | 1.7 | 2.0 | 2.1 | 2.2 | 2.3 | 2.4 | 2.5 | 2.6 | 2.7 |
|-----|-----|-----|-----|-----|-----|-----|-----|-----|-----|-----|-----|-----|-----|-----|-----|
| I | P | P | P | P | P | P | P | I | P | P | P | P | P | P | P | ..........

U.S. PATENT DOCUMENTS

| | | | |
|---|---|---|---|
| 6,453,115 B1 * | 9/2002 | Boyle | 386/68 |
| 6,512,882 B1 * | 1/2003 | Teunissen | 386/70 |
| 6,742,062 B2 * | 5/2004 | Yamada et al. | 710/65 |
| 7,016,749 B2 * | 3/2006 | Kuzumaki et al. | 700/97 |
| 7,218,635 B2 * | 5/2007 | Haddad | 370/394 |
| 7,231,129 B2 * | 6/2007 | Miyashita et al. | 386/46 |
| 7,313,315 B2 * | 12/2007 | Morris et al. | 386/95 |
| 7,398,543 B2 * | 7/2008 | Cotarmanac'h et al. | 725/93 |
| 2001/0026675 A1 * | 10/2001 | Schultz et al. | 386/68 |

FOREIGN PATENT DOCUMENTS

| | | |
|---|---|---|
| WO | WO 00/25515 | 5/2000 |
| WO | WO 02/19690 | 3/2002 |

* cited by examiner

METHOD AND SYSTEM FOR PROVIDING INSTANT REVERSE PLAY

BACKGROUND

1. Field

The present invention generally relates to multi-media program viewing, and more specifically to methods and systems for providing instant reverse play during video playback.

2. Background

Personal video recorders (PVRs), digital video recorders (DVRs), set-top-boxes and other similar consumer electronic devices provide so called trick modes to navigate recorded media contents, such as audio/video data, while such contents are being played back. The trick modes include, for example, fast forward and backward and slow motion at various speeds. These trick modes are analogous to ones available in analog devices like the VCRs. The trick modes let the user navigate the media contents beside the normal play. Those trick modes are useful features to have in a device for program viewing.

A number of methods for reversing the DCT-based (discrete cosine transform) motion compensated predictive coding video stream are commonly known in the art. Some of these methods include decoding the key frames (Intra-coded frames) and subsequent predictive frames (non-Intra-coded frames) in memory and then reversing them before such frames are displayed. In these methods, there is a definite delay before the reverse play action starts. This is due to the fact that group of pictures (GOPs) are decoded, stored and then displayed.

Hence, it would be desirable to provide a system and method that is capable of, amongst other things, minimizing delay when reverse play is initiated.

SUMMARY

A method for providing instant reverse play for video frames is disclosed. According to one aspect of the method, a multiplexed audio/video (A/V) stream is received from a source. The A/V stream is demultiplexed into corresponding video and audio streams. A program is rendered from the video and audio streams and played in real time. Video frames in the demultiplexed video stream are individually tagged as tag [X.y]. The video frames may include I-frames, P-frames and B-frames. An intra-table is generated to store the file location or frame address of each I-frame. Each I-frame is tagged as [X.0], where X starts from "1" and is incremented by one (1) for each subsequent I-frame. Similar to the tagging of each I-frame, each P- or B-frame is also tagged during the demultiplexing stage. For each P- or B-frame, X assumes the value of the associated I-frame and y assumes the value corresponding to that frame's position following the associated I-frame.

The demultiplexed video frames and their associated tags are provided to a video decoder. A forward queue and a reverse queue are maintained for the instant reverse play mechanism. As the demultiplexed video frames are decoded by the video decoder, the decoded video frames and their associated tags are stored in input buffers. During normal play, the stored frames are then sequentially pushed onto the forward queue via the input buffers, where forward queue is used in a FIFO (first-in-first-out) manner. Outputs from the forward queue are provided to a display device for displaying to a user. At the same time, the same outputs from the forward queue are also pushed onto the reverse queue.

During reverse play, which is initiated when the reverse play command is received, contents from the reverse queue are outputted in a LIFO (last-in-first-out) manner to the display device for displaying to a user. Reverse play is achieved since the contents from the reverse queue are outputted in a LIFO order. Outputs from the reverse queue are also pushed onto the forward queue. The forward queue and the reverse queue reverse their roles when reverse play is active. As reverse play starts, the tag corresponding to the oldest frame in the reverse queue is recorded. The recorded tag is then used to locate the corresponding I-frame address in the intra-table based on the value X of the tag. The frames starting with the tag [X.0] and up to the frame immediately preceding the frame which matches the recorded tag are decoded and placed in the reverse queue in order such that reverse play may continue smoothly. The previous I-frame location is then identified. The previous I-frame and its associated frames are decoded and placed in the reverse queue for reverse play to continue. The above process is repeated until reverse play is stopped or the start of file is reached.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. The description includes specific details for the purpose of providing an understanding of the present invention.

One or more of the embodiments of the present invention will now be described. The present invention describes a system for providing instant reverse play, where the reverse play action is initiated in an instantaneous manner without any noticeable delay. As will be further described below, the instantaneous reverse play is achieved by building the required information for the reverse play during normal play.

Figure 1:
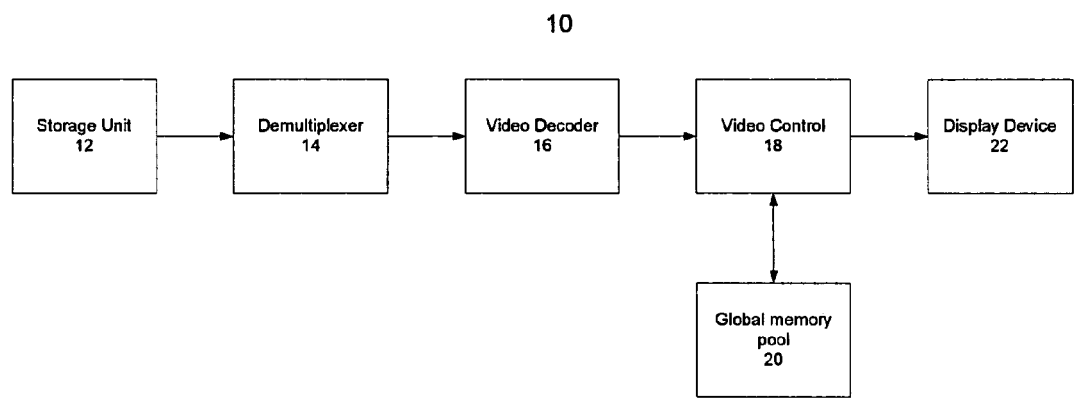
FIG. 1 is a simplified block diagram illustrating an embodiment of the present invention.

FIG. 1 shows one embodiment of a system 10 that may be used to provide instantaneous reverse play. The system 10 includes a storage unit 12, a demultiplexer 14, a video decoder 16, a video control unit 18, a global memory pool 20 and a display device 22. The various components of the system 10 may be integrated on an integrated circuit (IC) chip. The IC chip may, in turn, be incorporated into an audio/video device. Based on the disclosure and teachings provided herein, a person skilled in the art will appreciate how to deploy the present invention.

The storage unit 12 is used to store media contents, such as, audio/video data. The storage unit 12 may be a local or a network device. The storage unit 12 may include a removable medium, such as, a compact flash, a memory stick, a USB (universal serial bus) flash drive or a micro device, amongst others. The storage unit 12 may also include a hard disk, a semiconductor or magnetic media based, randomly accessible storage device and the like.

Input to the demultiplexer 14 is a compressed digital audio/video (A/V) stream provided by the storage unit 12. As noted above, the storage unit 12 may be a local or a network device. In one implementation, the A/V stream is compressed according to MPEG standards. The storage unit 12 may include one or more A/V files each providing an A/V stream.

A portion of the main memory (not shown) is allocated by the video control unit 18 to be used as the global memory pool 20 for decoded video frames. The available memory in the global memory pool 20 is subdivided for use by three (3) types of buffers, namely, input buffers, a forward queue and a reverse queue. The forward queue and the reverse queue may be made up of a number of buffers. The size of the forward queue and the reverse queue may vary depending on each application, system design and/or requirements. As will be further described below, the forward queue and the reverse queue are used to store the decoded video frames and their associated tags for subsequent normal and reverse play.

The video control unit 18 allocates a number of input buffers to the video decoder 16 from the global memory pool 20. An A/V stream is read from the storage unit 12 and is separated or demultiplexed into corresponding video and audio streams by the demultiplexer 14. The video stream includes a number of video frames and the audio stream includes a number of audio frames. The demultiplexer 14 also tags the video frames in the video stream.

The tag format used by the demultiplexer 14 to tag each video frame is [X.y], where "X" is the major tag number and "y" is the minor tag number. The initial value for the major tag number for the first Intra-coded frame (I-frame) is "1". The major tag number is incremented by one (1) for each new I-frame. The value for the minor tag number for each I-frame is "0". For example, for the first I-frame in the video stream, the tag is [1.0], and for second I-frame, the tag is [2.0] and so on.

The value of the major tag number for a non-Intra coded (i.e., P or B) frame follows the value of the major tag number associated with the immediately preceding I-frame. After each new I-frame, the initial value for the minor tag number for the first non-Intra coded (P or B) frame that follows the new I-frame starts from "1". The minor tag number is then also incremented by one (1) for each subsequent non-Intra coded (P or B) frame. For example, the first non-Intra coded frame after the first I-frame in the video stream has the tag [1.1] and the second non-Intra coded frame has the tag [1.2] and so on until the next I-frame is encountered; the tag for this next I-frame is [2.0] and the tag for the first non-Intra coded frame following this next I-frame is [2.1] and so on.

Furthermore, during the normal playing of the video stream, the file position (or frame address) of each video frame corresponding to each major tag number transition is saved along with the tag in a table called intractable. A major tag number transition occurs when the major tag number in the tag associated with the video frame changes, i.e., when the next I-frame is processed. Thus, each entry in the intra-table contains the file position corresponding to each I-frame (or the first occurrence of a new major tag number). For example, the first entry corresponds to the file position associated with the tag [1.0] and the second entry corresponds to the file position associated with the tag [2.0] and so on. As will be further described below, this information may be used to jump to a particular position in the A/V file where decoding of the video stream should begin for continual reverse play.

Figure 2:
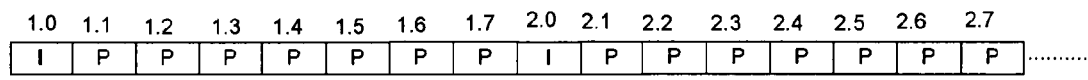
FIG. 2 is a schematic diagram illustrating an example of the tagging mechanism according to one embodiment of the present invention.

FIG. 2 shows an example of the tagging mechanism, as described above, for a video stream in which every I-frame is followed by seven (7) P-frames. The first I-frame has the tag [1.0] and the subsequent P-frames have corresponding tags from [1.1] to [1.7]. The second I-frame has the tag [2.0] and the subsequent P-frames have corresponding tags from [2.1] to [2.7]. The remaining video frames of the video stream are tagged in a similar manner.

Outputs from the demultiplexer 14, in the form of the compressed audio and video streams, are forwarded respectively to an audio decoder (not shown) and the video decoder 16. All the tags associated with the video frames in the video stream are also passed to the video decoder 16.

Figure 3:
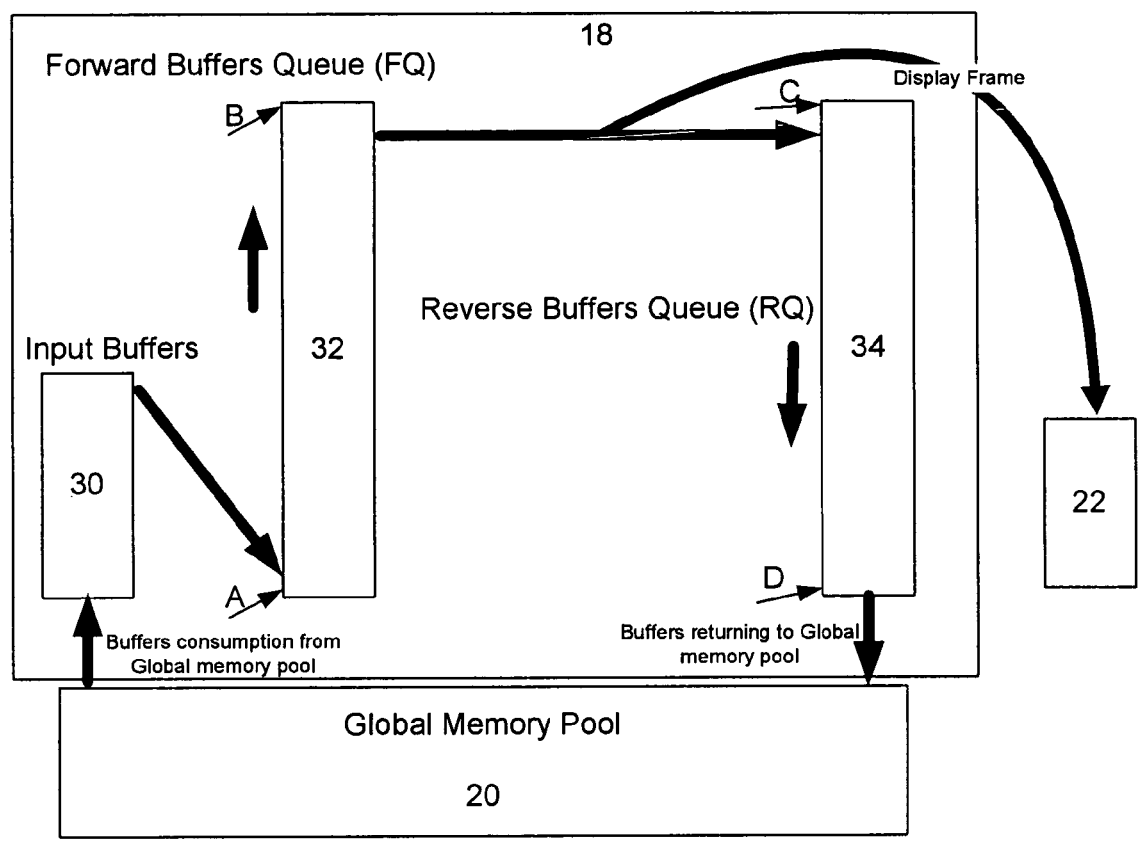
FIG. 3 is a simplified block diagram illustrating the data flow and use of memory in the forward direction of play.

FIG. 3 shows the data flow in the forward (normal play) direction. The video control unit 18 provides a number of input buffers 30 to the video decoder 16 from the global memory pool 20. The video decoder 16 receives a compressed video stream and the corresponding tags from the demultiplexer 14. The video decoder 16 decodes the video frames in the video stream. The decoded video frames along with their corresponding tags are then placed in the input buffers 30.

Contents (i.e., video frames and their associated tags) from the input buffers 30 are then sequentially pushed onto the forward queue 32 at point A. The forward queue 32 operates in a first-in-first-out (FIFO) manner, i.e., contents from the forward queue 32 are outputted in the same order as they came in. Outputs from the forward queue 32 at point B are provided to the display device 22 for displaying to a user. The data flow within the forward queue 32 is shown by the arrow going from point A to point B.

Outputs from the forward queue 32 are also pushed onto the reverse queue 34 at point C. When the reverse queue 34 becomes full, the buffer with the oldest contents is returned at point D to the global memory pool 20 and made available for reuse, i.e., the oldest contents in the reverse queue 34 are discarded. The data flow within the reverse queue 34 is shown by the arrow going from point C to point D.

Figure 4:
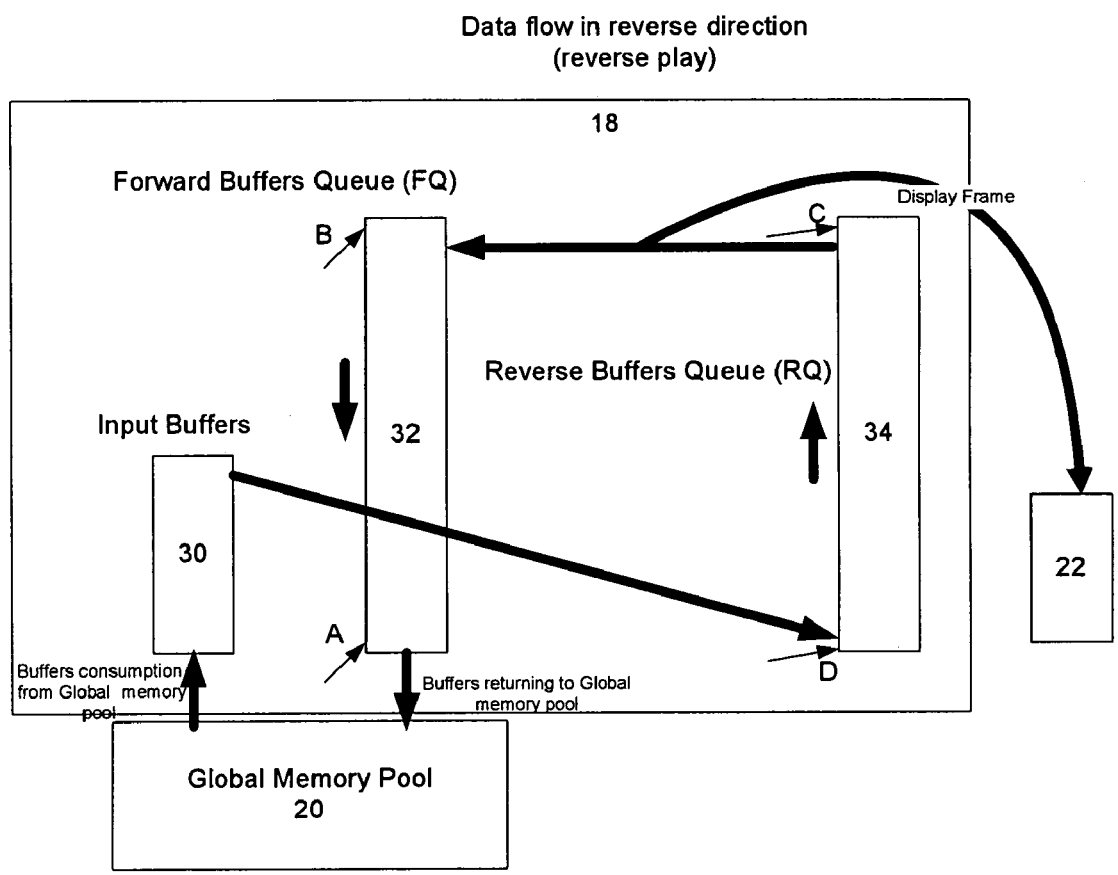
FIG. 4 is a simplified block diagram illustrating the data flow and use of memory in the reverse direction of play.

FIG. 4 shows the data flow in the reverse (reverse play) direction. As soon as the reverse play command is invoked by an input device, such as, a remote control, keyboard or any other similar device, contents from the reverse queue 34 are retrieved in a LIFO (last-in-first-out) order and provided to the display device 22. The display device 22 is then able to show reverse order of the play.

At the same time, the contents retrieved from the reverse queue 34 at point C are also pushed onto the forward queue 32 at point B. At the start of the reverse play, the forward queue 32 is used in a LIFO manner till all the buffers with the most recently decoded contents are returned at point A to the global memory pool 20 for reuse, i.e., the most recently decoded contents that are present in the forward queue 32 when reverse play is initiated are discarded first. Thereafter, both the forward queue 32 and the reverse queue 34 operate in a FIFO manner. In other words, contents received by the forward queue 32 from the reverse queue 34 are treated in a FIFO manner; and contents received by the reverse queue 34 from the input buffers 30 are similarly treated in a FIFO manner.

The data flow within the forward queue 32 is shown by the arrow going from point B to point A. It should be noted that the direction of the data flow within the forward queue 32 has been reversed during reverse play and is now from point B to point A, as opposed to the data flow shown in FIG. 3.

As soon as a reverse play command is received, the tag [X.y] of the oldest video frame in the reverse queue 34 is recorded. The recorded tag is then examined. The major tag number X is used to search for the corresponding I-frame address in the intra-table. Once the I-frame address is identified from the intra-table, the demultiplexer 14 is directed to seek the corresponding I-frame in the appropriate A/V file in the storage unit 12 using the I-frame address.

Once the I-frame is located in the appropriate A/V file, the corresponding A/V stream is de-multiplexed and tagged as described above starting with the located I-frame. Video frames from the corresponding demultiplexed video stream are provided to the video decoder 16. The decoded video frames and their associated tags are then provided to the input buffers 30. Contents from the input buffers 30, in turn, are sequentially pushed to the reverse queue 34 at point D. It should be noted that the direction of the data flow within the reverse queue 34 has been reversed during reverse play and is now from point D to point C, as opposed to the data flow shown in FIG. 3.

It should be further noted that the decoded video frames received from the video decoder 16 via the input buffers 30 are arranged in the normal play order. Therefore, in order to allow the video stream to be displayed continually in reverse order, the decoded video frames received via the input buffers 30 are re-ordered within the reverse queue 34.

Furthermore, the number of decoded video frames to be provided to the reverse queue 34 is determined based on the recorded tag. As noted above, the recorded tag represents the oldest video frame in the reverse queue 34 when the reverse play command is received. The recorded tag is used to ensure that the video frames starting with the located I-frame and up to the video frame represented by the recorded tag are decoded and placed in the reverse queue 34. This is done to effect smooth, continual reverse play if reverse play is to continue beyond the oldest video frame as represented by the recorded tag. In other words, video frames older than the oldest video frame represented by the recorded tag are needed if reverse play is to extend beyond the contents stored in the reverse queue 34 when the reverse play command is received.

Figure 5:
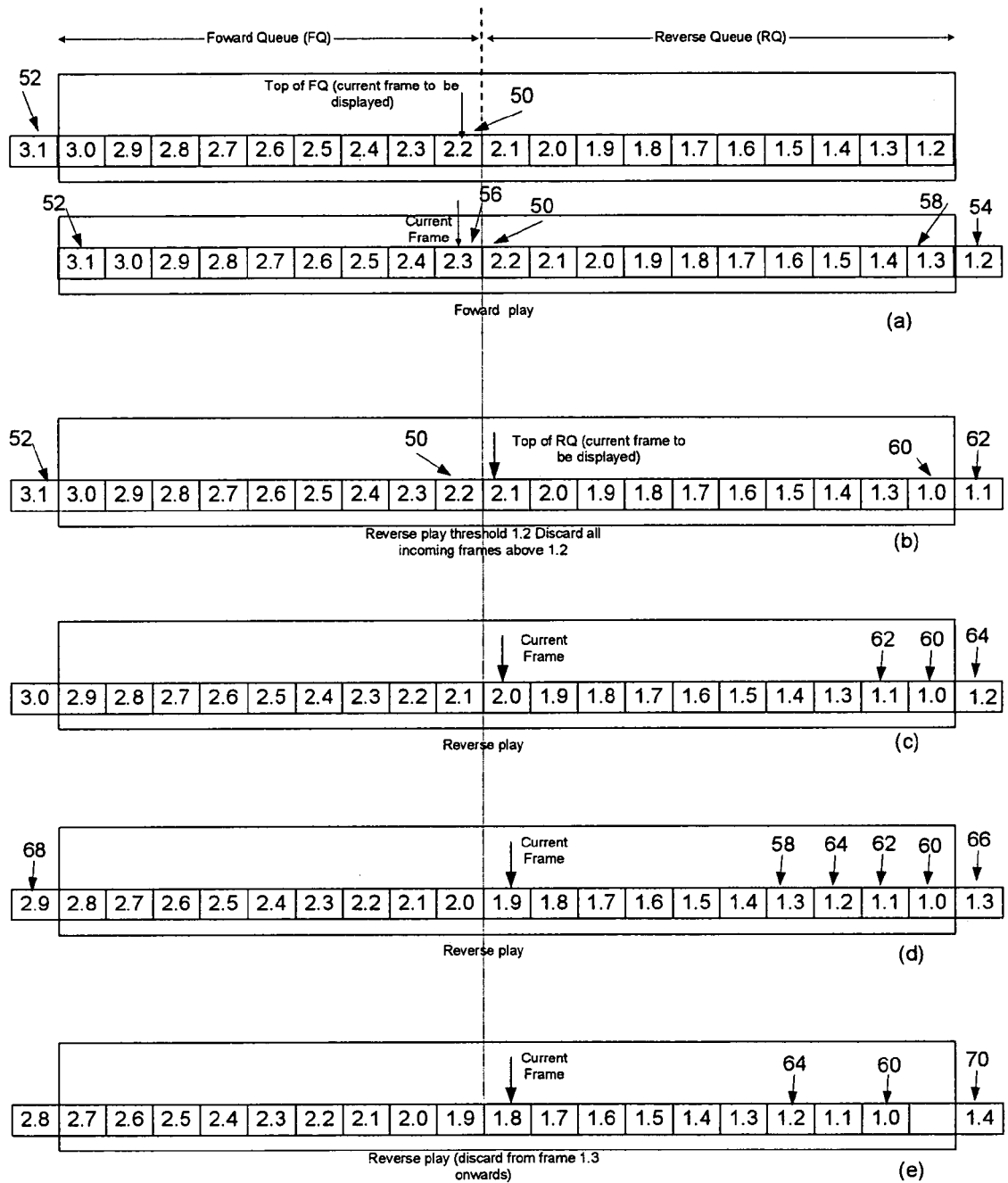
FIGS. 5(a)-(e) are schematic diagrams illustrating various states of the forward and reverse queues during normal play and on invocation of the reverse play mode.

FIGS. 5(*a*)-(*e*) show the states of the forward queue and the reverse queue during normal and reverse play and how the queues are used during reverse play.

FIG. 5(*a*) shows the states of the forward and reverse queues during normal play. The video frame 50 corresponding to tag [2.2] pointed to by the "current frame" pointer is outputted from the forward queue 32 and displayed by the display device 22. By outputting the video frame 50, there is now room in the forward queue 32 to receive video frame 52 corresponding to tag [3.1]. Video frame 52 is the latest decoded video frame.

At the same time, the video frame 50 is inserted into the beginning of the reverse queue 34. To make room for video frame 50, the buffer containing the oldest video frame 54 corresponding to tag [1.2] is returned to the global memory pool 20. In other words, contents from the oldest video frame 54 are discarded. After the video frame 52 is inserted into the beginning of the forward queue 32, the current frame pointer moves to the video frame 56 corresponding to tag [2.3].

FIG. 5(*b*) shows the states of the forward queue 32 and the reverse queue 34 when reverse play is invoked after video frame 50 has been displayed in normal play as shown in FIG. 5(*a*). When reverse play is invoked, the video frames are outputted from the reverse queue 34 for displaying. In this instance, the video frame 50 at the beginning of the reverse queue 34 is displayed again. The video frame 50 is also pushed onto the forward queue 32. The oldest video frame in the reverse queue 34 is video frame 58 with tag [1.3] when reverse play is invoked. The tag [1.3] is recorded and then communicated to the demultiplexer 14. The demultiplexer 14 examines the tag [1.3] and identifies the major tag number as "1". Using the identified major tag number, the demultiplexer 14 then extracts the frame address of the corresponding I-frame with tag [1.0] from the intra-table. Video frames are retrieved from the storage unit 12 and decoded, starting from the video frame with the tag [1.0] onwards till the video frame with the tag [1.2]. The last video frame to be decoded and provided to the reverse queue 34 has tag [1.2] because the recorded tag is [1.3]. As shown in FIG. 5(*b*), the video frame 60 with the tag [1.0] is inserted at the end of the reverse queue 34. Next, the video frame 62 with the tag [1.1] is provided by the video decoder 16. With respect to the forward queue 32, the video frame 52 with the tag [3.1] is discarded. The buffer used to store video frame 52 is returned to the global memory pool 20 for reuse.

During reverse play, a re-ordering of the video frames in the reverse queue 34 is effected when freshly decoded video frames are pushed into the reverse queue 34. As seen in FIG. 5(*c*), the decoded video frame 62 with the tag [1.1] is placed ahead of the video frame 60 with the tag [1.0] in the reverse queue 34 so that reverse play order is maintained. Similarly, FIG. 5(*d*) shows the video frame 64 with the tag [1.2] being placed in front of the video frame 62 with the tag [1.1]. FIG. 5(*d*) also shows the freshly decoded video frame 66 with the tag [1.3] provided by the video decoder 16 while the video frame 68 with the tag [2.9] is getting discarded from the forward queue 32. At this point, since a previous video frame 58 with the tag [1.3] is already in the reverse queue 34, the remaining video frames (e.g., frames 66 and 70) being decoded in the video stream will be discarded.

FIGS. 5(*a*)-(*e*) illustrate a case where play has just been started and only the first couple of I-frame sequences (in this case, I-frames with tags "1.0" and "2.0") have been displayed and placed in the forward and reverse queues 32, 34 when reverse play is initiated. The video frame 60 with the tag [1.0] represents the start of the A/V file. Thus, once the video frame 60 has been displayed, reverse play will stop automatically. Normal play will then resume with the video frame 62 having the tag [1.1] getting displayed from the forward queue 32, followed by the video frame 64 having the tag [1.2] etc. Normal play resumes with the video frame 62 because the video frame 62 is the last video frame inserted into the forward queue 32 during reverse play. The demultiplexer 14 and the video decoder 16 then collectively provide the needed video frames into the forward queue 32 to ensure normal play continues.

In most cases, the oldest video frame in the reverse queue 34 may not be associated with the first I-frame having the tag [1.0] when reverse play is initiated. For example, the oldest video frame may have a tag [3.5] when reverse play is initiated. Then, upon displaying the I-frame with the tag [3.0], the demultiplexer 14 would use the intra-table to look up the frame address of the previous I-frame (in this case, the I-frame with the tag [2.0]) and the reverse play mechanism would continue as described above in FIGS. 5(*a*)-(*e*).

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the embodiments disclosed herein may be embodied directly in hardware, in a software module executable by a processor, or in a combination of both, in the form of control logic, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit of scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more". All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for".

What is claimed is:

1. A method for displaying video data instantly in reverse order, the method comprising:
   receiving a compressed audio and video (A/V) stream from a source;
   demultiplexing the compressed A/V stream into an audio stream and a video stream, the video stream having a plurality of compressed video frames, the plurality of compressed video frames having a plurality of key frames, each key frame being followed by one or more associated frames;
   tagging each of the plurality of compressed video frames with a tag;
   storing the tag associated with each key frame and file position of each key frame in a table;
   decoding the plurality of compressed video frames to generate a plurality of decoded video frames while maintaining their corresponding tags;
   during normal play:
      storing the plurality of decoded video frames in a forward queue; and
      outputting the plurality of decoded video frames in the forward queue in a FIFO (first-in-first-out) order to a reverse queue and a display device for display, wherein the reverse queue operates in a FIFO manner by discarding the oldest decoded video frame stored in the reverse queue when the reverse queue is full; and
   during reverse play:
      recording the tag of the oldest decoded video frame in the reverse queue when a reverse play command is received;
      outputting the plurality of decoded video frames in the reverse queue in a LIFO (last-in-first-out) order to the forward queue and the display device for display, wherein the forward queue initially operates in a LIFO manner by discarding the most recently decoded video frame stored in the forward queue;
      using the recorded tag to retrieve one or more of the plurality of compressed video frames in the compressed A/V stream;
      tagging and decoding the retrieved one or more compressed video frames to generate one or more newly decoded video frames; and
      forwarding the one or more newly decoded video frames to the reverse queue.

2. The method of claim 1 further comprising:
   during reverse play, outputting the one or more newly decoded video frames in the reverse queue in a FIFO order to the forward queue and the display device, wherein the forward queue operates in a FIFO manner by discarding the oldest of the one or more newly decoded video frames stored in the forward queue.

3. The method of claim 1 wherein the tag associated with each of the plurality of the decoded video frames has a format [X.y];
   wherein X represents a major tag number and y represents a minor tag number;
   wherein the value of X is incremented to uniquely identify each key frame;
   wherein the value of y is used to represent the position of a video frame, other than a key frame, that is associated with a corresponding key frame.

4. The method of claim 1 wherein the plurality of key frames include a plurality of Intra-coded frames and the one or more associated frames include one or more non-Intra-coded frames.

5. The method of claim 1 further comprising:
   during reverse play, re-ordering the one or more newly decoded video frames within the reverse queue.

6. The method of claim 1 wherein the recorded tag is used to identify from the table the file position of the key frame that is associated with the compressed video frame represented by the recorded tag.

7. The method of claim 6 wherein the retrieved one or more compressed video frames include the key frame that is associated with the compressed video frame represented by the recorded tag and one or more compressed video frames associated with the key frame, up to the compressed video frame represented by the recorded tag.

8. The method of claim 7 wherein the retrieved one or more compressed video frames further include a preceding key frame that precedes the key frame that is associated with the compressed video frame represented by the recorded tag and one or more compressed video frames associated with the preceding key frame.

9. The method of claim 1 wherein the source includes a removable medium including one of a compact flash, a memory stick, a USB (universal serial bus) flash drive or a micro drive.

10. The method of claim 1 wherein the source includes one of a hard disk and a semiconductor or magnetic media based, randomly accessible storage device.

11. An audio/video device configured to perform the method as recited in claim 1.

12. A method for displaying video data instantly in reverse order, the method comprising:

demultiplexing a compressed A/V stream received from a source into an audio stream and a video stream, the video stream having a plurality of compressed video frames, the plurality of compressed video frames having a plurality of Intra-coded frames (I-frames), each I-frame being followed by one or more associated non-Intra-coded frames;

tagging each of the plurality of compressed video frames with a tag;

storing the tag associated with each I-frame and file position of each I-frame in a table;

decoding the plurality of compressed video frames to generate a plurality of decoded video frames while maintaining their corresponding tags;

during normal play:

storing the plurality of decoded video frames in a forward queue; and outputting the plurality of decoded video frames in the forward queue in a FIFO (first-in-first-out) order to a reverse queue, wherein the reverse queue operates in a FIFO manner by discarding the oldest decoded video frame stored in the reverse queue when the reverse queue is full;

displaying the plurality of decode video frames outputted from the forward queue; and during reverse play:

recording the tag of the oldest decoded video frame in the reverse queue when a reverse play command is received;

outputting the plurality of decoded video frames in the reverse queue in a LIFO (last-in-first-out) order to the forward queue, wherein the forward queue initially operates in a LIFO manner by discarding the most recently decoded video frames stored in the forward queue;

displaying the plurality of decoded video frames outputted from the reverse queue;

using the recorded tag to retrieve one or more of the plurality of compressed video frames from the compressed A/V stream stored in the source, wherein the retrieved one or more compressed video frames are older than the compressed video frame represented by the recorded tag;

tagging and decoding the retrieved one or more compressed video frames to generate one or more newly decoded video frames; and forwarding the one or more newly decoded video frames to the reverse queue.

13. The method of claim 12 further comprising:

during reverse play, outputting the one or more newly decoded video frames in the reverse queue in a FIFO order to the forward queue and the display device, wherein the forward queue operates in a FIFO manner by discarding the oldest of the one or more newly decoded video frames stored in the forward queue.

14. The method of claim 12 wherein the tag associated with each of the plurality of the decoded video frames has a format [X.y];

wherein X represents a major tag number and y represents a minor tag number;

wherein the value of X is incremented to uniquely identify each I-frame;

wherein the value of y is used to represent the position of a non-Intra-coded frame that is associated with a corresponding I-frame.

15. The method of claim 12 further comprising:

during reverse play, re-ordering the one or more newly decoded video frames within the reverse queue.

16. The method of claim 12 wherein the recorded tag is used to identify from the table the file position of the I-frame that is associated with the compressed video frame represented by the recorded tag.

17. The method of claim 16 wherein the retrieved one or more compressed video frames include the I-frame that is associated with the compressed video frame represented by the recorded tag and one or more compressed video frames associated with the I-frame, up to the compressed video frame represented by the recorded tag.

18. The method of claim 17 wherein the retrieved one or more compressed video frames further include a preceding I-frame that precedes the I-frame that is associated with the compressed video frame represented by the recorded tag and one or more compressed video frames associated with the preceding I-frame.

19. The method of claim 12 wherein the source includes a removable medium including one of a compact flash, a memory stick, a USB (universal serial bus) flash drive or a micro drive.

20. The method of claim 12 wherein the source includes one of a hard disk and a semiconductor or magnetic media based, randomly accessible storage device.

* * * * *